United States Patent [19]

Schardt

[11] Patent Number: 5,013,205
[45] Date of Patent: May 7, 1991

[54] TOWING VEHICLE FOR SHUNTING AIRCRAFT ON THE GROUND

[75] Inventor: Volker Schardt, Kreuztal, Fed. Rep. of Germany

[73] Assignee: KAMAG Transporttechnik GmbH & Co., Ulm, Fed. Rep. of Germany

[21] Appl. No.: 431,031

[22] Filed: Nov. 1, 1989

[30] Foreign Application Priority Data

Nov. 2, 1988 [DE] Fed. Rep. of Germany ....... 3837151

[51] Int. Cl.⁵ .............................................. B64F 1/22
[52] U.S. Cl. .................................. 414/429; 180/14.1; 414/563; 414/426; 244/50; 280/402
[58] Field of Search ............... 414/563, 427, 426, 429, 414/428, 911; 244/50; 280/402; 180/904, 14.1

[56] References Cited

U.S. PATENT DOCUMENTS

| 4,113,041 | 9/1978 | Birkeholm | 180/14.1 |
| 4,632,625 | 12/1986 | Schuller et al. | 414/429 |
| 4,911,604 | 3/1990 | Pollner et al. | 414/428 |

FOREIGN PATENT DOCUMENTS 8806121 8/1988 PCT Int'l Appl. .................. 244/50

Primary Examiner—Frank E. Werner
Attorney, Agent, or Firm—Peter K. Kontler

[57] ABSTRACT

In conventional towing vehicles the front wheels of the aircraft are pulled or pushed onto a lifting shovel or the like and the aircraft or the towing vehicle must be maintained in motion so that the front wheel assembly can be acted upon by undesirable forces.

In order to ensure gentle and reliable retention and lifting of the front wheel assembly from a state of standstill as well as equally reliable and gentle towing away of the aircraft, there are provided for each front wheel four gripper arms which engage the periphery of the front wheel. The rear gripper arms are pivotable inwardly in a vertical plane. The idle positions of all gripper arms are selected by a computer which is programmed in dependency on the respective aircraft type. The arrangement is such that the axis of the strut of the front wheel is always disposed at right angles to the axis of the non-steerable rear wheels of the towing vehicle and the axis of a live ring for the holding- and lifting device invariably coincides with the axis of the front wheel. The towing vehicle can tow away at least five different types of aircraft without changes of the towing vehicle (with the exception of the computer program).

3 Claims, 3 Drawing Sheets

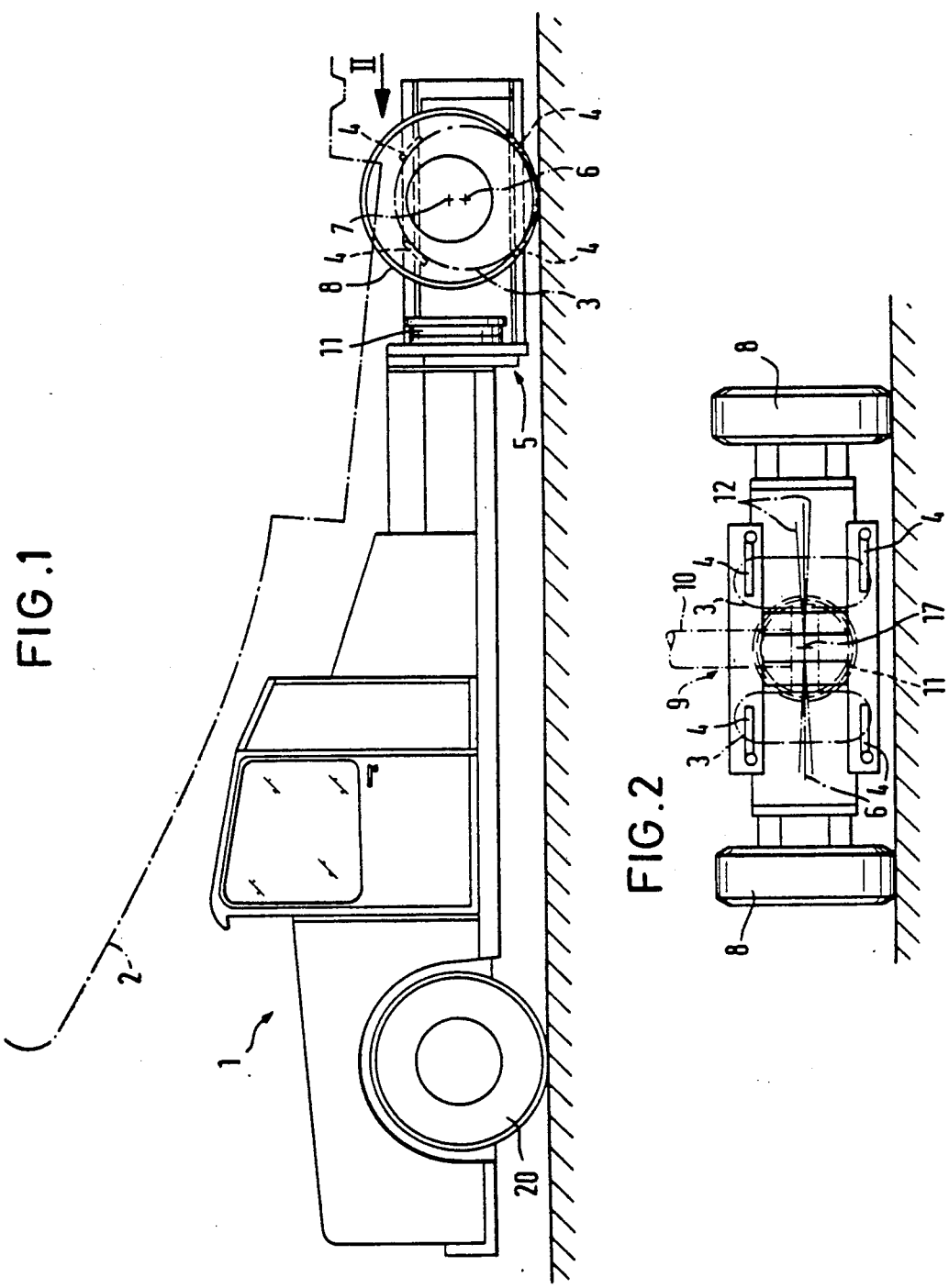

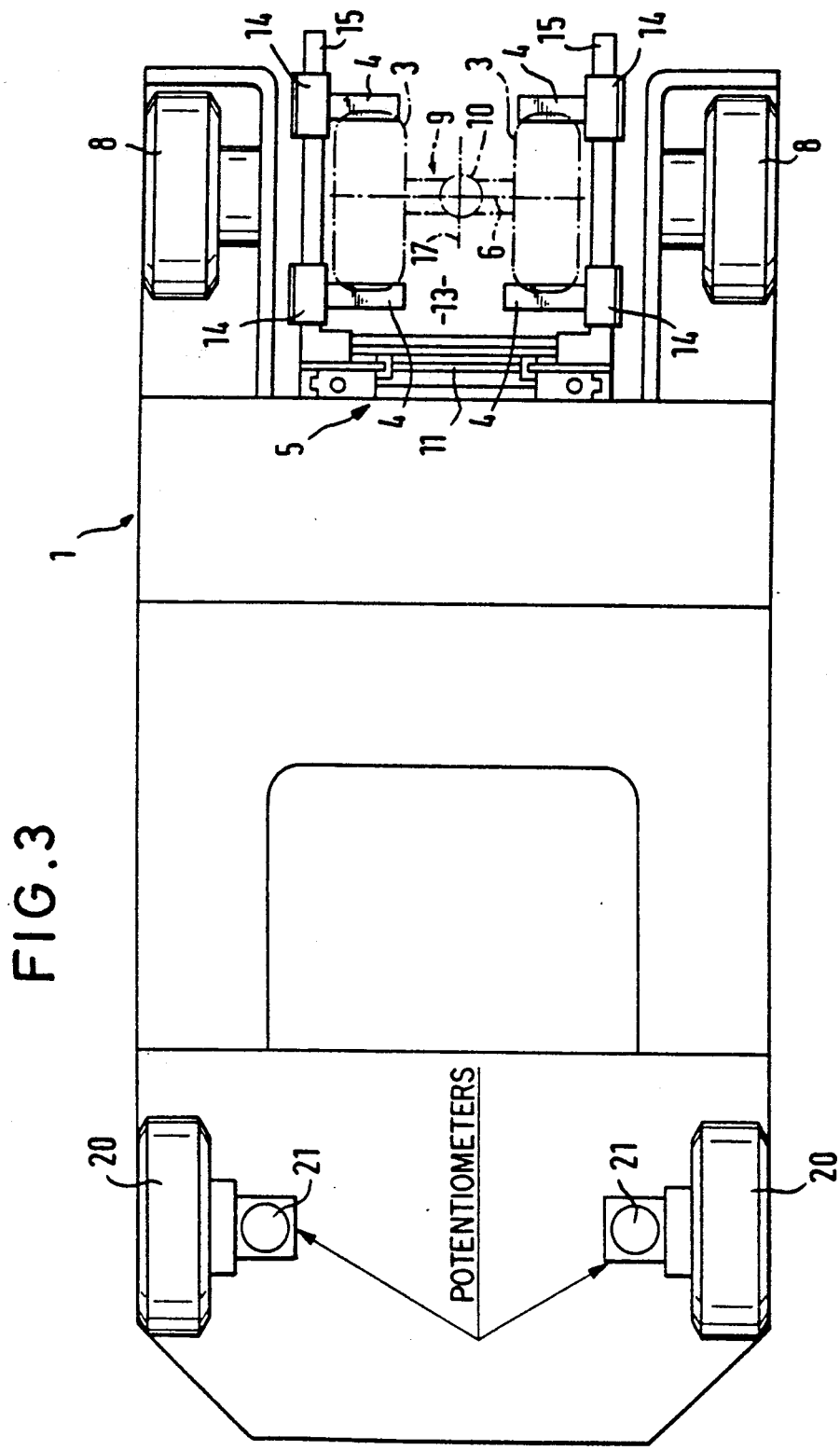

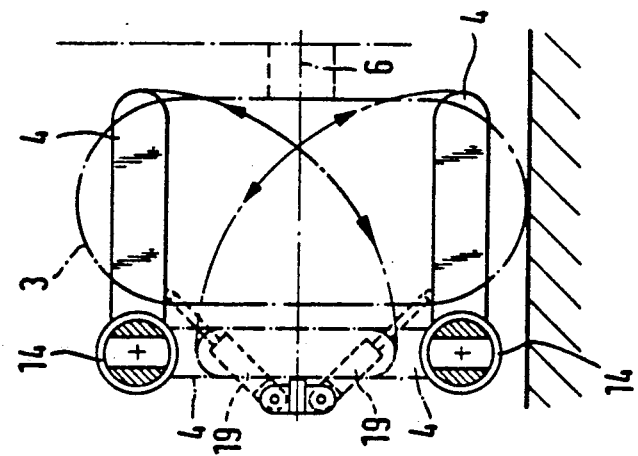
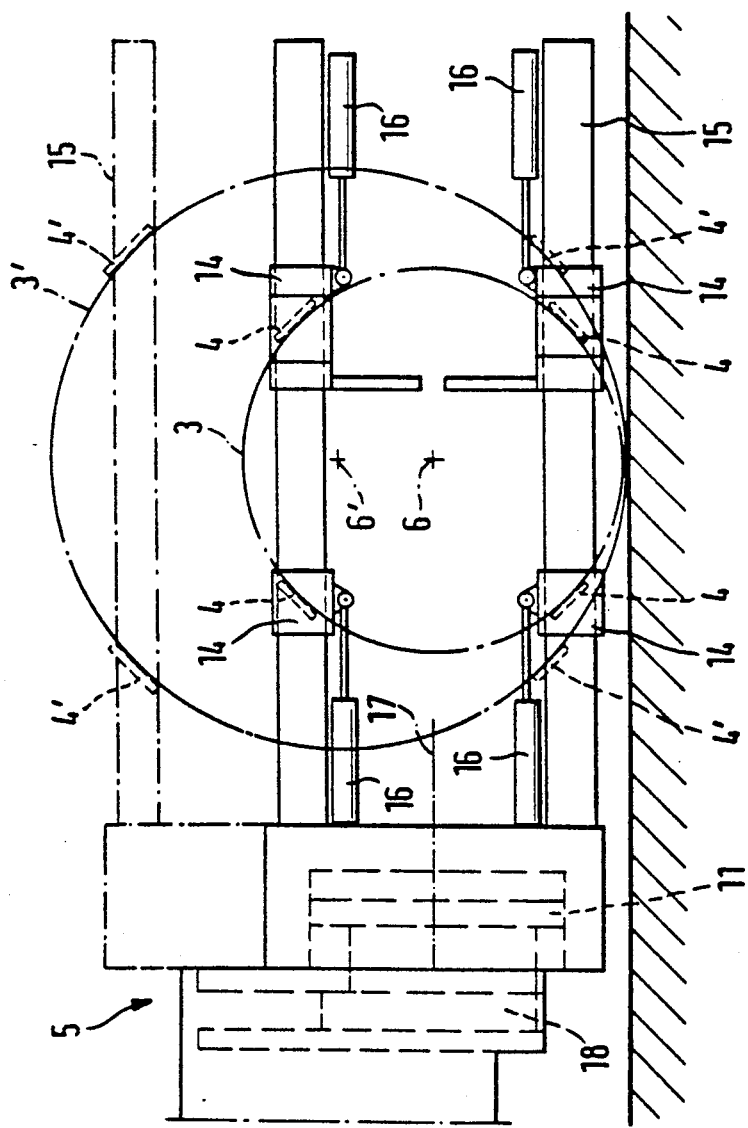

TOWING VEHICLE FOR SHUNTING AIRCRAFT ON THE GROUND

BACKGROUND OF THE INVENTION

The invention relates to a towing vehicle for shunting airplanes on the ground, with a U-shaped recess in the rear part of the towing vehicle for reception of a front wheel assembly which is turnable about a substantially vertical axis, a holding- and lifting device at each side of the U-shaped recess of the towing vehicle and comprising gripper arms serving to engage the front wheel assembly in the region of the periphery or peripheries of the front wheel or wheels, the rear gripper arms being pivotable as a pair inwardly and outwardly in a vertical plane which is disposed at right angles to the longitudinal axis of the towing vehicle, an adjusting device which conforms the gripper arms to the diameters of the respective front wheels, the turning axis of the front wheel assembly crossing at right angles the axis of the rear wheels of the towing vehicle.

Heretofore, it was necessary to provide five different towing vehicles for five aircraft types which differ from each other as to weight and size. The next development includes tractors which manipulate the aircraft without a towing bar. Such a tractor is described, for example, in the published German patent application 36 16 807 and has a lifting shovel onto which the front wheel assembly of the aircraft must be pushed or pulled. At such time, the aircraft is in motion with its brakes released, whereas the towing vehicle is braked.

The same problem arises in a towing vehicle according to the published German patent application 38 01 855. In this conventional design, the rear part of the towing vehicle has a U-shaped recess for a lifting shovel which is lowered to the ground and onto the supporting surface of which the front wheel assembly is thereafter pulled with assistance from a gripping- and pulling device. It is again necessary to move the aircraft during coupling to the towing vehicle, and such movement is likely to take place in a direction in which undesirable forces are likely to act upon the front wheel assembly.

In an embodiment of the towing vehicle according to the published German patent application 38 01 855, the lifting shovel is not only movable up and down but is also pivotable and tiltable with reference to a pendulum point. The means for supporting the lifting shovel comprises longitudinal, transverse and parallelogram linkages as well as piston-cylinder-units which permit the lifting shovel to perform a plurality of movements about a variety of axes in the transverse and longitudinal directions of the vehicle.

In certain types of aircraft the axis of the front wheel assembly is forwardly inclined with respect to the vertical so that, when the aircraft moves in a curve, the axis of the wheel becomes inclined to the horizontal. In such instances, the lifting shovel is likely to be tilted about the pendulum point to thus ensure a gentle towing operation. However, in view of the numerous degrees and possibilities of freedom, the conventional design according to the published German patent application 31 01 855 is relatively complex a to its construction and controls because all movements of the lifting shovel must be positively controlled or guided which does not ensure tension-free towing away under all circumstances.

U.S. Pat. No. 43 75 244 discloses an analogous towing vehicle wherein the front wheel assembly can be accepted while the towing vehicle as well as the aircraft are at a standstill and, therefore, the aforedescribed negative influences of forces do not develop at all. However, this conventional design also exhibits the drawback that, in the event of changes of inclination between the axis of the wheel of the front wheel assembly and the rear wheel axis of the towing vehicle, such as develop for example during travel on uneven ground, the front wheel assembly is acted upon by undesirable forces.

OBJECT OF THE INVENTION

An object of the present invention is to further develop a towing vehicle of the type described in U.S. Pat. No. 43 75 244 in such a way that one ensures deformation-free, gentle and reliable towing away of a plurality of different types of aircraft.

SUMMARY OF THE INVENTION

In accordance with the invention, this object is accomplished in that the holding- and lifting device comprises four gripper arms serving to embrace each front wheel and being mounted on pushers which are shiftably mounted on substantially horizontally extending upper and lower slideways for horizontal conformance to the diameters of the respective front wheels, the slideways being movable relative to each other in a vertical direction for vertical conformance to the diameter of the respective front wheel, and in that the entire movable part of the holding- and lifting device is mounted in a live ring for limited pivotal movement about an axis which is parallel to the longitudinal axis of the towing vehicle, the engagement movements of the gripper arms being adjustable in dependency on the diameter of the front wheel of the respective aircraft type in such a way that, when the turning axis of the front wheel assembly crosses at right angles the axis of the non-steerable rear wheels of the towing vehicle, the axis of the live ring invariably coincides with the axis of the front wheel or wheels.

In accordance with an advantageous further development, the live ring and the entire movable part of the holding- and lifting device are jointly movable up and down in a vertical guide which is provided on the towing vehicle. This results in a particularly simple and disturbance-free design.

In order to avoid damage to the front wheel assembly of the aircraft in a simple manner, it is desirable that the steering angle of the steerable front wheels of the towing vehicle be capable of being limited by potentiometers in dependency upon the maximum permissible turning angle of the turning axis of the front wheel assembly in the respective type of aircraft.

In the novel towing vehicle the holding- and lifting device is automatically adjusted, preferably by a computer, in dependency upon different wheel diameters of front wheels in five different types of aircraft, namely in such a way that when the front wheels are embraced and lifted, neither the towing vehicle nor the aircraft must be kept in motion to thus prevent the application of undesirable forces upon the front wheel assembly which, depending on the type of aircraft, applies to the towing vehicle a weight of between 6 and 25 tons. Thus, and in contrast to heretofore known towing systems, the embracing of front wheels and lifting take place while the towing vehicle and the aircraft are at a complete standstill. The controlling can be carried out in accordance with a computer program which can be introduced, for example, by inserting into the towing vehicle a code card which is characteristic of the corresponding type of aircraft.

Due to the fact that in the towing position the axis of the front wheel assembly is located at right angles to and above the non-steered rear drive axis of the towing vehicle, at which time the turning axis of the front wheel assembly crosses this drive axis at right angles, and due to the fact that an imaginary extension of the axis of the live ring crosses the axis of the wheels of the front wheel assembly, the front wheel assembly, namely the shaft of the front wheel and/or the strut, is not subjected to any tensional stresses if, during towing, the towing vehicle happens to perform a rolling movement about its longitudinal axis on uneven ground.

Due to the principle of its design, the novel towing vehicle is of relatively simple construction and its initial cost is low, particularly in view of the fact that at least five different types of jumbo aircraft can be serviced without any changes of the towing vehicle. All that is necessary is to move the towing vehicle to the front wheels with the front inner gripper arms while the outer (rear) gripper arms are pivoted inwardly to thus achieve a very rapid completion of manipulation. Automatic restriction of the steering angle to approximately 70°-80° can be affected with potentiometers upon the steered front drive wheels of the towing vehicle.

BRIEF DESCRIPTION OF THE DRAWING

FIG. 1 a side elevational view of a towing vehicle,

FIG. 2 a view in the direction of arrow II in FIG. 1,

FIG. 3 a plan view of the towing vehicle,

FIG. 4 on a somewhat enlarged scale a side elevational view of the rear part of the towing vehicle, and FIG. 5 the rear left gripper arms drawn to a somewhat larger scale.

DESCRIPTION OF PREFERRED EMBODIMENTS

FIG. 1 shows the towing vehicle 1 in a side elevational view in a position in which it is located below the nose 2, shown by broken lines, of an aircraft and in which the front wheels 3 of the front wheel assembly 9 of the aircraft are each already embraced by four gripper arms 4 of a holding- and lifting device 5 but are yet to be lifted. It can be seen in FIG. 1 that the axis 6 of the front wheels 3 is located in a vertical plane which also includes the axis 7 of the rear drive wheels 8 of the towing vehicle 1.

In the view of FIG. 1, the front wheel assembly 9 with its front wheels 3 and the strut 10 is already lifted for the towing operation. FIG. 1 further shows a live ring 11 which is provided in the liftable and lowerable part of the holding- and lifting device 5 and compensates for lateral rolling movements of the towing vehicle 1 on uneven ground as indicated by dot-dash lines 12.

As can be seen in FIG. 3, the holding- and lifting device 5 is seated in a U-shaped recess 13 which is formed by the forked rear part of the towing vehicle 1. The gripper arms 4 are secured to pushers 14 which are shiftable along upper and lower slideways 15. The slideways 15 are vertically adjustable relative to each other. Adjustment of the pushers 14 can be carried out by the aforementioned computer program in accordance with the respective type of aircraft or front wheel diameter. The slideways 15 and the pushers 14 are acted upon by hydraulic cylinders 16 in order to shift the pushers 14, too, in accordance with a program (see FIG. 4).

FIG. 4 shows schematically the manner of ascertaining different front wheel diameters which can vary from 600 to 1000 mm, depending upon the type of aircraft. Furthermore, FIG. 4 shows that the axis 17 of the live ring 11 extends through the axis 6 of the front wheels 3, namely midway between the front wheels (compare FIG. 2), as shown in FIG. 4 with reference to the smaller front wheel 3. In the case of a larger front wheel 3', the live ring 11 must be visualized in a correspondingly raised position so that its axis 17 extends through the axis 6' of the larger front wheel 3'. The entire movable part of the holding- and lifting device 5, complete with the live ring 11, is movable up and down in a vertical guide 18.

As shown in FIG. 5, the rear gripper arms 4 can be pivoted in and out in a vertical plane extending in parallelism with the axis of the rear wheels 8 of the towing vehicle 1. To this end, there are provided hydraulic cylinders 19.

The coupling and towing away of an aircraft with assistance from the described towing vehicle is carried out as follows:

In the first step, a suitable pin is introduced into the front wheel assembly 9 of the aircraft to prevent steering from the cockpit. A code card is inserted into a computer in the towing vehicle. This code card is programmed in accordance with the respective type of the aircraft to be towed away. At such time, the slideways 15 are already adjusted as to height and mutual spacing in dependency on the diameter of the respective front wheel whereby the inner pushers 14 also advance to positions in which the axes 6 or 6' of the subsequently engaged front wheels 3 or 3' are located in a vertical plane including the axis 7 of the rear drive wheels 8 of the towing vehicle 1. The rear gripper arms 4 are pivoted inwardly, as indicated in FIG. 5 by dot-dash lines, so that the rear end of the U-shaped recess 13 is fully open. The towing vehicle 1 is thereupon driven to the front wheel assembly 9 until the non-pivotable front gripper arms come in contact with the front wheels 3 or 3'. At this time, the rear pushers 14 are positioned in such a way that the rear gripper arms 4 can be pivoted behind the front wheels 3 or 3' into the U-shaped recess 13, and such pivoting takes place in an automatic way. The described pivotal mounting of the rear gripper arms 4 is important because many airplanes are provided with rock-intercepting sheets behind the front wheels 3, 3'. In the illustrated arrangement, the rear gripper arms 4 can be pivoted between the front wheel 3, 3' and the intercepting sheet. Upon completed pivoting of the rear gripper arms 4, they are moved against the front wheels 3, 3' by the associated cylinders 16 through the medium of their pushers 14 so that the front wheel assembly 9 is then embraced. In the next step, the holding- and lifting device 5 is lifted by cylinders (not shown) to move the front wheels to a level approximately 200 mm above the ground. The towing away and shunting of the aircraft can begin. All of these are automatically controlled operations which are carried out within an interval of a few seconds before the towing away begins. Suitable potentiometers 21 (compare FIG. 3) at the steerable front wheels 20 of the towing vehicle 1 ensure that the maximum permissible steering angle of the front wheel assembly for the respective type of aircraft is not exceeded.

I claim:

1. In a towing vehicle for shunting airplanes on the ground, with a U-shaped recess in the rear part of the towing vehicle for reception of a front wheel assembly which is turnable about a substantially vertical axis, a holding- and lifting device disposed at each side of the U-shaped recess of the towing vehicle and comprising front and rear gripper arms serving to engage the front wheel assembly in the region of the periphery of at least one of the front wheels, the rear gripper arms being pivotable as a pair inwardly and outwardly in a vertical plane which is disposed at right angles to the longitudinal axis of the towing vehicle, an adjusting vehicle which conforms the gripper arms to the diameters of the respective front wheels, the turning axis of the front wheel assembly crossing the axis of the rear wheels of the towing vehicle at an angle of 90 degrees, the improvement which consists in that the holding- and lifting device comprises four gripper arms serving to embrace each front wheel and being mounted on pushers which are shiftably mounted on substantially horizontally extending upper and lower slideways for horizontal conformance to the diameters of the respective front wheels, in that the slideways are mounted on support means and are movable relative to each other in a vertical direction for vertical conformance to the diameter of the respective front wheel, and in that the entire movable part of the holding- and lifting device is mounted in a live ring for limited pivotal movement about an axis which is parallel to the longitudinal axis of the towing vehicle, the engagement movements of the gripper arms being adjustable in dependency on the diameter of the front wheel of the respective aircraft type in such a way that, when the turning axis of the front wheel assembly crosses at right angles the axis of the non-steerable rear wheels of the towing vehicle, the axis of the live ring invariably coincides with the axis of each front wheel.

2. The improvement according to claim 1 wherein the live ring and the entire movable part of the holding- and lifting device are jointly movable up and down in a vertical guide which is provided on the towing vehicle.

3. The improvement according to claim 1, wherein the steering angle of the steerable front wheels can be limited by potentiometers in dependency upon the maximum permissible turning angle of the turning axis of the front wheel assembly in the respective type of aircraft.

* * * * *